May 25, 1965  D. L. WHITE  3,185,942
PULSE TIME AND FREQUENCY CHANGER UTILIZING DELAY
LINE WITH CONTROLLABLE DELAY
Filed Dec. 29, 1961

INVENTOR
D. L. WHITE
BY Ray M. Porter Jr.
ATTORNEY

United States Patent Office 3,185,942
Patented May 25, 1965

3,185,942
PULSE TIME AND FREQUENCY CHANGER UTILIZING DELAY LINE WITH CONTROLLABLE DELAY
Donald L. White, Mendham, N.J., assignor to Bell Telephone Laboratories, Incorporated, New York, N.Y., a corporation of New York
Filed Dec. 29, 1961, Ser. No. 163,304
5 Claims. (Cl. 333—30)

This invention relates to acoustical wave transmission devices, and more particularly, to devices in which the time spectrum of a pulse of ultrasonic or acoustic wave energy, is modified by the properties of an ultrasonic delay medium.

There are numerous occasions in various pulse handling systems, such as data transmission systems, digital computers, telephone switching systems, radar systems and the like where there is a known need for changing the frequency or compressing or expanding the time duration of an information pulse. A number of electronic devices of varying degrees of complexity, reliability and cost are known which perform these functions. On the other hand, the use of ultrasonic devices for performing various functions in pulse systems has enjoyed considerable recent interest because of their simplicity, reliability and economy. These ultrasonic devices take advantage of the fact that the velocity of propagation of a mechanical vibration or an acoustic wave in much lower than that of electrical signals by transforming the electrical signal into the ultrasonic wave, sending the ultrasonic wave down a mechanical path of predetermined length, and reconverting the wave into an electrical signal at the far end.

It is, therefore, an object of this invention to compress or expand a pulse of ultrasonic wave energy.

It is a further object to increase or decrease the frequency components and the energy level in a pulse upon an ultrasonic wave energy transmission path.

In accordance with the present invention it has been recognized that if a pulse on an ultrasonic delay line passes through a moving interface between a medium having one propagation velocity and a medium having a second propagation velocity, the frequency of the pulse energy as well as its time duration and energy level is changed. Depending upon the relative magnitude of the velocities of the media and the velocity at which the interface moves, the pulse may be compressed or expanded in various degrees. The effect bears some similarity to the well known Doppler effect but yet is quite different. Whereas, the Doppler effect depends only upon the velocity of propagation of one medium and the movement of a source or a barrier, the phenomenon in accordance with the present invention depends upon the velocity of propagation of two media and the movement of an interface therebetween.

In accordance with a specific embodiment of the invention to be described, the required moving interface is produced by a moving light beam upon an ultrasonic delay medium comprising a photosensitive piezoelectric material. The conductivity and, therefore, the ultrasonic velocity of propagation of this material is altered by the light.

In another embodiment a low frequency ultrasonic wave is superimposed upon a low resistivity, semiconductive, piezoelectric ultrasonic path supporting the pulse. As the low frequency wave moves along the path it varies the strain of the material comprising the path in response to the wave amplitude and, therefore, produces moving regions of different velocity of propagation for the higher frequency pulse to be modified.

Inasmuch as it is a limitation upon the principles of the present invention that each pulse to be modified pass through a single interface, special features of the above-described embodiments reside in the correlation between the length of the pulse, the length of the ultrasonic line and the relative velocities of propagation and interface movement so that one and only one interface is presented to each of a train of pulses applied to the line.

The above-mentioned objects, the nature of the present invention, its various advantages and features will appear more fully upon consideration of the following detailed description taken in connection with the drawings in which:

FIG. 1, given for the purpose of explanation, is a schematic representation of a theoretical delay line having a single velocity interface moving along it;

Figure 1:
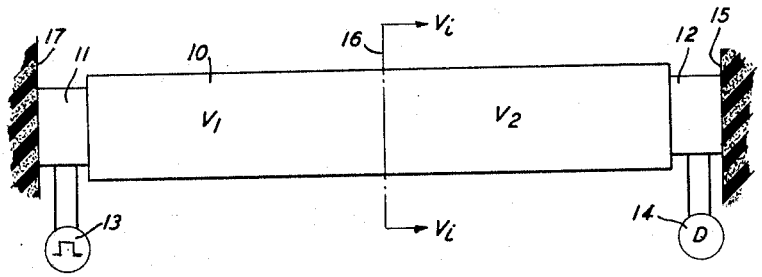

Referring more particularly to FIG. 1, a pulse modifying section 10 of ultrasonic delay line is shown interposed between ultrasonic transducers 11 and 12. Transducer 11 converts the electrical pulse received from source 13 into acoustic vibrations for travel down line 10 to transducer 12 which converts the acoustical energy into electrical signals to be delivered to utilization device 14. Transducer 12 is followed by an acoustical wave absorber 15 that absorbs and dissipates any vibrations not converted by transducer 12 into electrical signals and, therefore, prevents reflection along line 10. A similar acoustical wave absorber 17 precedes transducer 11 which absorbs and dissipates reflections that arise along line 10 as a result of the processes to be described. These components are all conventional in the art and no further consideration need be given to them.

Delay line 10 itself has the property, represented only schematically in FIG. 1, that its left-hand section has a velocity $v_1$ for acoustical wave energy thereon; that its right-hand section has a velocity $v_2$, different from $v_1$; and that the interface 16 between the sections is moving at the instant under consideration with the velocity $v_i$ to the right. Alternative ways in which this moving interface is produced in accordance with the invention will be described hereinafter.

Several possible relationships between $v_1$, $v_2$ and $v_i$ will now be examined in order to demonstrate the principles of the invention.

Case I $$v_i < v_2 < v_1$$

Figure 2:
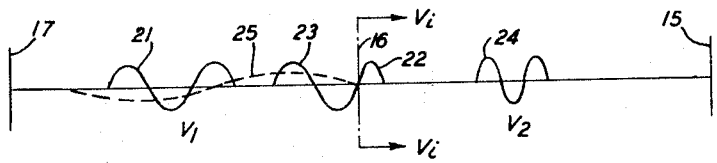
FIG. 2 is a diagram of a pulse in various relationships to the moving interface of FIG. 1.

Referring to FIG. 2, it will be seen that if $v_i$ is smaller than $v_2$ and both are smaller than $v_1$, a pulse launched by transducer 11 will overtake the moving interface 16 and pass from the faster section $v_1$ into the slower section $v_2$ at some point along the length of the line. When this occurs, the leading edge 22 of the pulse which passes through interface 16 is foreshortened because it travels slower than the trailing edge 23. The frequency of the pulse 24 which has completed the transit into the medium of velocity $v_2$ is increased and may be expressed:

$$f_2 = \frac{v_2}{v_1}\left(\frac{v_1 - v_i}{v_2 - v_i}\right)f_1 \qquad (1)$$

where $f_1$ is the frequency of the initial pulse in portion $v_1$. The time duration of the pulse has been decreased by a corresponding amount.

A portion of the incident wave will, of course, be reflected from the discontinuity at interface 16 as represented on FIG. 2 by wave 25. Since this energy will experience a true Doppler shift, its frequency will be substantially decreased and may be expressed:

$$f_r = f_1 \frac{v_1 - v_i}{v_1 + v_i} \quad (2)$$

This substantially decreased frequency will fall outside of the range to which either transducer 11 or 12 respond and will, therefore, be dissipated in absorber 17.

*Case II*

$$v_i > v_1 > v_2$$

Under this condition the moving interface 16 will overtake a pulse which had previously reached the section of slower velocity $v_2$. Since the trailing edge of the pulse moves faster than the leading edge, the pulse is again shortened and its frequency increased. The new pulse frequency is $$f_2 = \frac{v_2}{v_1}\left(\frac{v_i - v_2}{v_i - v_1}\right) f_1 \quad (3)$$

*Case III*

$$v_i < v_1 < v_2$$

This case, of course, is the reverse process of Case I and represents a condition for which the pulse frequency will be decreased and its time spectrum expanded. The new frequency is determined by a relation similar to Equation 1 wherein $v_1$ has been substituted for $v_2$ and $v_2$ for $v_1$.

*Case IV*

$$v_i > v_2 > v_1$$

This case is similarly the reverse process of Case II and represents a condition for which the pulse frequency will be decreased and its time spectrum expanded. The new frequency is determined by a relation similar to Equation 2 wherein $v_1$ has been substituted for $v_2$ and $v_2$ for $v_1$.

In the preceding theoretical analysis only a single pulse has been considered with respect to a medium having a single interface. A practical embodiment, of course, involves a train of pulses and a plurality of interfaces, each of which modifies one pulse. Therefore, a certain correlation between the parameters is necessary so that when any given pulse has crossed an interface between a media of first velocity into a media of second velocity it will remain in the media of second velocity until it reaches the output transducer. Otherwise, the modification which the pulse experiences in crossing the interface would be undone by the reverse action if it crossed a second interface of opposite velocity change. This correlation may most easily be developed after considering a practical embodiment in which the problem is presented.

Figure 3:
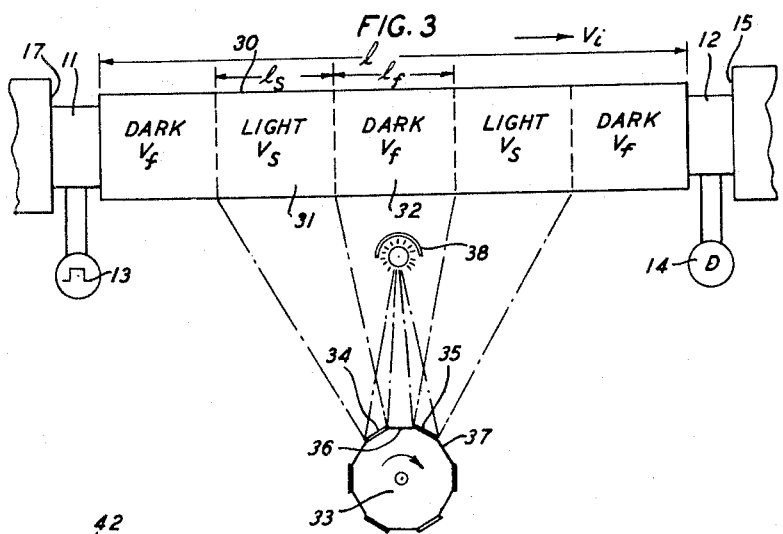
FIG. 3 is an illustrative embodiment in accordance with the invention employing photosensitive piezoelectric material.

Turning now to FIG. 3, an illustrative embodiment of the invention is shown in which the ultrasonic delay line comprises a member 30 of photosensitive piezoelectric material of the type disclosed by A. R. Huston in his copending application Serial No. 23,441, filed April 20, 1960, now Patent No. 3,145,354. As there disclosed, a class of materials, of which cadmium sulphide is exemplary, has a velocity of propagation for ultrasonic wave energy that depends upon the illumination of the material. In a qualitative way the illumination changes the conductivity of the material and since the material is also piezoelectric, it changes the amount of piezoelectric field that can be supported by the material. Since ultrasonic velocity depends upon the stiffness of the material, which, in turn, depends upon the energy required to create a piezoelectric field, increasing the illumination of the material has the direct effect of decreasing its ultrasonic velocity. For further details and analysis, reference may be had to the above-mentioned application.

Moving regions 31 and 32 of light and dark, respectively, and slow and fast ultrasonic velocity, respectively, are produced along delay medium 30 by the use of a rotating member 33 having mirrored or reflecting circumferential segments 34 and 35 that are separated by interposed, non-reflecting segments 36 and 37. Segments 34 and 35 reflect the light from source 38 upon delay medium 30. As member 33 rotates, alternating regions of light and dark are swept along medium 30. Since member 33 may be easily driven at a speed of several thousand revolutions per minute, and since the radius between member 33 and medium 30 may be made large, the velocity of the illuminating regions along medium 30 may be made equivalent to or greater than the velocity of propagation of an ultrasonic pulse therealong.

The frequency change produced by the embodiment of FIG. 3 is, therefore, identical to that described above for the theoretical model. However, since a plurality of interfaces now exist, consideration must be given to their proportions. In general, the length of each region must be at least great enough that the longest possible pulse to be modified may be contained within the region. Furthermore, there must be such correlation between the length of each region, the velocity of the interface, the length of the pulse and the total length of the line so that one interface will have moved completely through one pulse during the time that pulse has traversed the length between the input and output transducers and so that the trailing edge of that pulse will have reached the output transducer before it is reached by or reaches a succeeding interface. Stated in another way, the pulse is received completely from the input transducer in a region of one velocity and is delivered completely to the output transducer from an immediately adjacent region of a different velocity. More specifically, assume in the embodiment of FIG. 3 that $l_s$ and $l_f$ designate the lengths of the slow and fast velocity regions in centimeters, that these regions have respective velocities $v_s$ and $v_f$ in centimeters/sec., $l$ is the total length between the input and output transducers in centimeters and $t_o$ is the length of the pulse in seconds. For Case I in which the pulse is injected into the fast region and overtakes the interface, the region lengths must be $$l_f > v_f t_o$$
$$l_s > \frac{v_s^2}{v_f}\left(\frac{v_f - v_i}{v_s - v_i}\right) t_o \quad (4)$$

and the total length falls in the range $$\frac{v_s l_s}{v_s - v_i} > l > \frac{t_o v_f^2}{v_s - v_i} \quad (5)$$

For Case II in which the pulse is injected first into the slow region and is overtaken by the interface, the region lengths must be $$l_s > v_s t_o$$
$$l_f > v_s \left(\frac{v_i - v_s}{v_i - v_f}\right) t_o \quad (6)$$

and the total length falls in the range $$\frac{v_i l_f}{v_i - v_f} > l > t_o \frac{v_i v_s}{v_i - v_s} \quad (7)$$

In both cases the repetition rate of the pulse is, therefore $$t_r = \frac{v_i}{l_f + l_s} \quad (8)$$

In the usual design $t_r$ and $t_o$ are determined by related equipment and the magnitudes of $v_f$, $v_s$ and $v_i$ are determined by the amount of time or frequency change desired. The designer is, therefore, free to use any solution of Equations 6, 7 and 8 in terms of $l_s$, $_f$ and $l$.

It should be understood that the optical apparatus shown in FIG. 3 represents only one simplified way in which line 30 may be scanned to produce moving regions of different electrical conductivity and, therefore, moving regions of different ultrasonic velocity. Other methods of optical scanning may readily be devised by those skilled in the art. Furthermore, it should be understood that other ways of progressively changing the conductivity of a line of piezoelectric material, will progressively change its ultrasonic velocity. For example, progressively moving a region of mechanical strain along an ultrasonic transmission line will produce a moving region of changed velocity if the line is made of a material that would be piezoelectric if in high resistivity form but that also has a low resistivity in the range for which the velocity at the pulse frequency changes with changes in resistivity.

Figure 4:
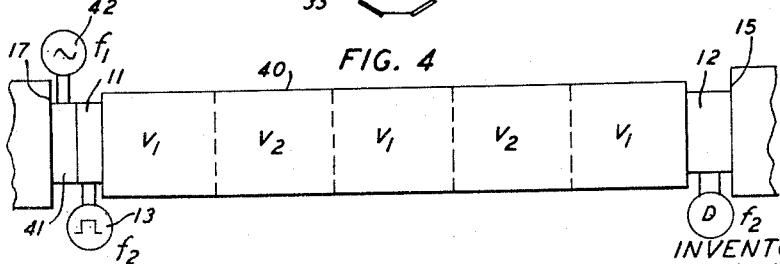
FIG. 4 is an illustrative embodiment in accordance with the invention employing strain sensitive piezoelectric material.

In the embodiment shown in FIG. 4 such a moving region of mechanical strain is produced by the novel use of a second, low frequency ultrasonic wave. Line 40 comprises a member of low resistivity, piezoelectric, semiconductive material preferably from groups III–V or II–VI. The material is doped with impurity atoms or illuminated with light to obtain a resistivity in the range for which a change in resistivity produces a change in the ultrasonic velocity at the frequency of the pulse. For example, if a pulse has a carrier frequency of 50 mc., the resistivity of the medium should be about 4000 ohm-cm. With this resistivity the velocity of sound of the pulse varies with resistivity. If the medium is cadmium sulfide, an electron concentration of $5 \times 10^{12}$ electrons/cm.$^3$ will produce the above-defined resistivity.

In addition to signal transducer 11 at the left-hand end, a low frequency transducer 41 is provided between transducer 11 and absorber 17. Transducer 41 converts the electrical signal of low frequency $f_1$ from source 42 into an ultrasonic wave which travels to the right along line 40. The low frequency ultrasonic wave varies the strain of the material of line 40 as it propagates which, in turn, causes the conductive carriers in the material to form into bunches. This change in carrier concentration in material at the low frequencies $f_1$ in effect replaces the ordinary piezoelectric field response that would be exhibited if the material were highly resistive. Thus, the carrier concentration in any given plane normal to the direction of propagation of the low frequency wave is varied about the initial concentration in a sinusoidal way that corresponds to the frequency and amplitude of the wave. Variation of the carrier concentration, varies the conductivity of the material, which, in turn, varies the ultrasonic velocity for the high frequency pulse in the same manner as the optically produced conductivity changes in the embodiment of FIG. 3. High frequency pulses $f_2$, therefore, are presented with regions of different velocities which move at a rate determined by the low freqency $f_1$. While the interfaces are not as sharply defined as those produced in FIG. 3, the region of high electron concentration has an average velocity $v_1$ and the region of low electron concentration an average velocity $v_2$ which may be validly substituted in the equations set forth above. In other respects, adjustment and operation of the embodiment of FIG. 4 corresponds to the embodiment of FIG. 3.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In combination, a source of pulses of ultrasonic wave energy, a propagation medium to which said pulses are applied for propagation therealong, said medium having at least two sections of first and second different propagation velocities for said energy and an interface between said sections, and means for moving said interface along said medium at a third velocity different from both said first and second velocities.

2. The combination according to claim 1 wherein said medium comprises material that is photoconductive and piezoelectric and wherein said means for moving comprises means for causing alternate regions of light and shadow to move along said material.

3. The combination according to claim 1 wherein said medium comprises material that is semiconductive and piezoelectric and wherein said means for moving comprises means for causing a lower frequency ultrasonic wave to propagate along said material.

4. In combination, a source of pulses of ultrasonic wave energy, a propagation medium to which said pulses are applied for propagation therealong at a first velocity, and means for producing at least one region having a second propagation velocity different from said first velocity moving along said medium at a third velocity different from both said first and second velocities.

5. The combination according to claim 4 wherein the length of said one region and the total length of said medium is such that one of said pulses passes between said medium and said one region one time during its propagation along said medium.

References Cited by the Examiner

UNITED STATES PATENTS

| | | | |
|---|---|---|---|
| 2,553,491 | 5/51 | Shockley | 333—72 |
| 2,655,607 | 10/53 | Reeves | 307—88.5 |
| 2,872,577 | 2/59 | Hart | 333—30 |
| 2,877,431 | 3/59 | McSkimin | 333—30 |
| 2,921,134 | 1/60 | Greenspan | 333—30 |
| 2,922,923 | 1/60 | Yando | 333—30 |
| 2,936,381 | 5/60 | Long | 333—30 |
| 2,941,110 | 6/60 | Yando | 333—30 |
| 2,951,168 | 8/60 | Yando | 333—30 |

OTHER REFERENCES

McCue: Tech. Report #179, Lincoln Laboratory Mass. Inst. of Technology, April 15, 1958.

HERMAN KARL SAALBACH, *Primary Examiner.*